May 18, 1965  J. J. WEBBER  3,184,223
GASEOUS FLOW REVERSAL VALVE
Filed Feb. 20, 1963  3 Sheets-Sheet 1

INVENTOR.
John J. Webber
BY
Russell, Chittick & Pfund
Attorneys

# United States Patent Office 3,184,223
Patented May 18, 1965

3,184,223
GASEOUS FLOW REVERSAL VALVE
John J. Webber, Holden, Mass., assignor to Morgan Construction Company, Worcester, Mass., a corporation of Massachusetts
Filed Feb. 20, 1963, Ser. No. 260,012
4 Claims. (Cl. 263—15)

This invention relates to combustion control systems for regenerative furnaces and more particularly to an improved mechanism for alternately reversing gaseous flow through two adjacent ducts or flues.

In conventional regenerative systems presently in use, incoming combustion air is usually heated by being passed through primary or primary and secondary regenerators, commonly called checkers, containing open brickwork. In some systems, the secondary regenerators have been replaced by a rotary air preheater. Before passing the combustion air through the checkers, the brickwork contained therein has been previously heated by an outgoing flow of high temperature waste gases which are in turn subsequently exhausted through an ejector stack to the atmosphere. Thus it can be seen that the air preheating cycle demands a periodic reversal of gas flow through the checkers in order to first heat the internal open brickwork in order to store waste heat before subsequently transferring said heat to an incoming flow of combustion air. Consequently, two sets of primary and secondary checkers are usually connected in parallel to the furnace, thereby insuring a constant supply of heated combustion air and a constant outlet for the waste gases. As incoming combustion air is heated by being passed through the first set of checkers, outgoing waste gases are simultaneously being passed through a second parallel set of checkers and exhausted to the atmosphere. When a desired amount of the heat retained by the brickwork contained within the first set of checkers has been removed by the incoming combustion air and the brickwork in the second set of checkers heated to a sufficiently high temperature by the exhausting waste gases, the flow of air and waste gases within each set of checkers is alternated and reversed.

Heretofore, the reversal of gas and air flow within the checkers has been accomplished through the use of an elaborate system of valves and dampers, necessitating extensive initial equipment expenditures and resulting in greater maintenance problems during operation of the system. For example, a system presently extensively used requires a separate ejector stack and throat valve for each set of primary and secondary checkers.

In addition, separate gates or dampers must be provided to alternately feed combustion air to each set of checkers and to alternately provide a flow of ejection air to each ejector stack. Consequently, in present systems, in order to reverse the gas flow in two sets of checkers, four valves must be operated. Furthermore, separate stacks are commonly provided for each set of primary and secondary checkers.

Other valve mechanisms contemplate the use of single slide valve mechanisms embodying either refractory constructions or water cooling means in order to withstand the high temperatures of the exhausting waste gases. However, experience has indicated that these constructions frequently require replacement and in addition, present serious maintenance problems due to the elaborate cooling means utilized.

It is therefore an object of the present invention to provide an improved single slide valve construction capable of minimizing both equipment expenditures and maintenance costs.

Another object of the present invention is to combine a single slide valve construction with air ejector means in order to cool the valve mechanism while producing forced draft in the exhaust stack.

A further object of the present invention is to provide a greatly simplified means for cooling the slide valve, thereby simplifying maintenance requirements while extending the useful life of all valve components.

Another object of the present invention is to eliminate the need of separate exhaust stacks for each set of primary and secondary checkers.

A further object of the present invention is to avoid the necessity of alternating the flow of ejection air where forced draft in the exhaust stack is required.

These and other objects of the present invention will become more apparent as the description proceeds with the aid of the accompanying drawings in which.

Figure 1:
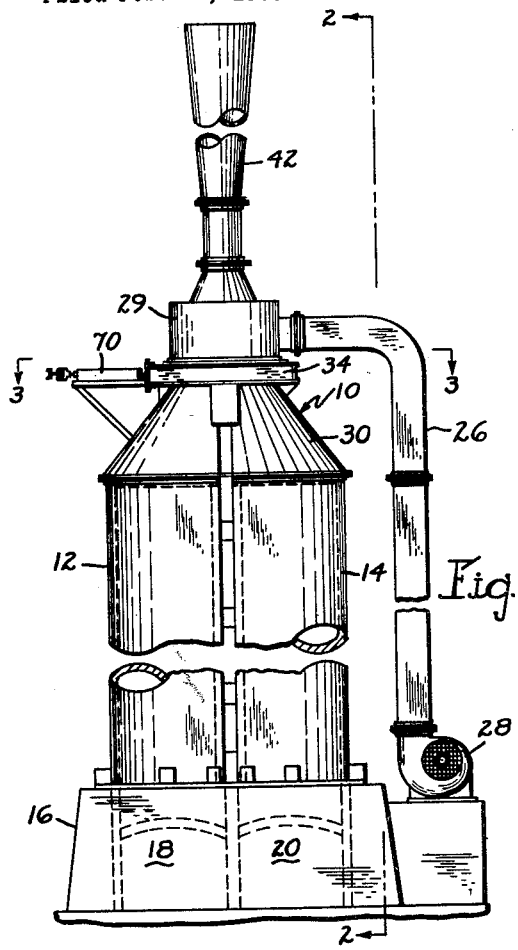
FIG. 1 is a view in side elevation of the single slide-valve housing and ejector unit mounted over two secondary regenerators.
Figure 2:
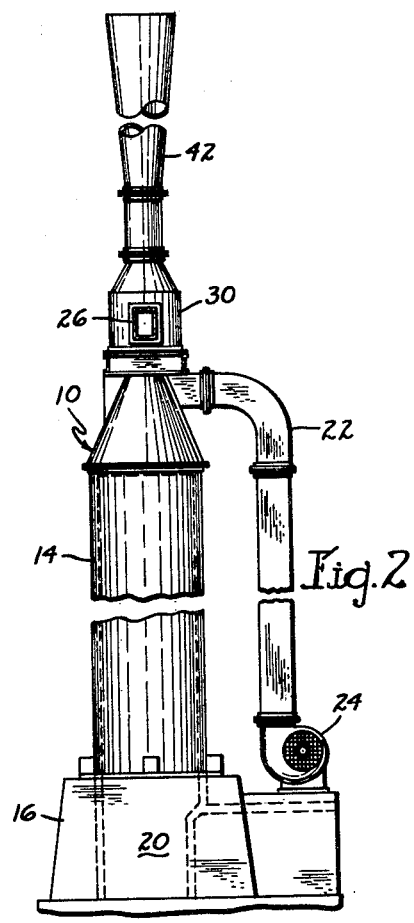
FIG. 2 is a view in side elevation of the housing and ejector unit taken along 2—2 of FIG. 1.

Referring now to FIGS. 1 and 2, a single slide valve housing indicated generally at 10 is shown positioned over and supported by two parallel secondary regenerators 12 and 14 (hereinafter referred to as checkers). Secondary checkers 12 and 14 are in turn supported by lower foundation 16 and connected in series through interior ducts 18 and 20 to parallel primary checkers (not shown) or any other form of heat recovery equipment. It should be noted at this point that secondary checkers 12 and 14 are sometimes replaced by a single rotary air preheater. Where this is done, the single slide valve housing may be mounted directly over the rotary air preheater, since reversal of gaseous flow is still necessary through the primary checkers. The fresh incoming combustion air is delivered to the upper portion of valve housing 10 through duct 22 by a combination motor and blower 24. No valves are necessary in duct 22 since a constant supply of combustion air is required. Depending on the setting of the slide valve mechanism, the fresh combustion air will flow downwardly through either checker 12 or 14 and inward through a series-connected primary checker to the furnace. At the same time, waste gases will be flowing from the furnace through a parallel primary checker and upwardly through the other secondary checker for subsequent exhaustion through the ejector unit and stack to the atmosphere. Ejection air is pumped through duct 26 by a combination motor and blower 28 and is delivered to an ejector 29 positioned intermediate housing 10 and stack 32. Since only one stack and one ejector is required when the single slide valve mechanism is utilized, there is no need to alternate or reverse the flow of ejection air by placing valves intermediate blower 28 and the ejector.

Figure 3:
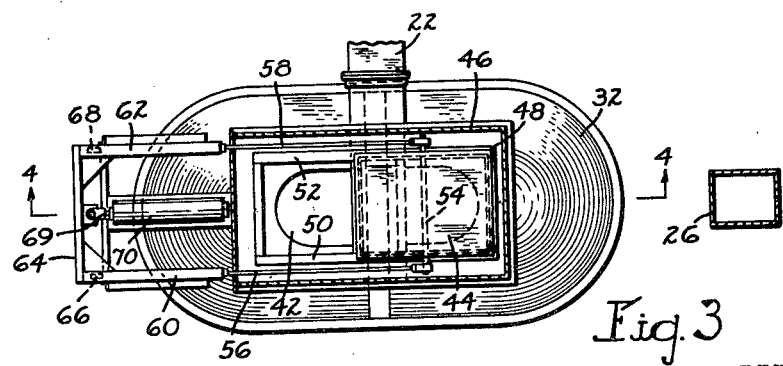
FIG. 3 is a view in horizontal section taken along line 3—3 of FIG. 1.
Figure 4:
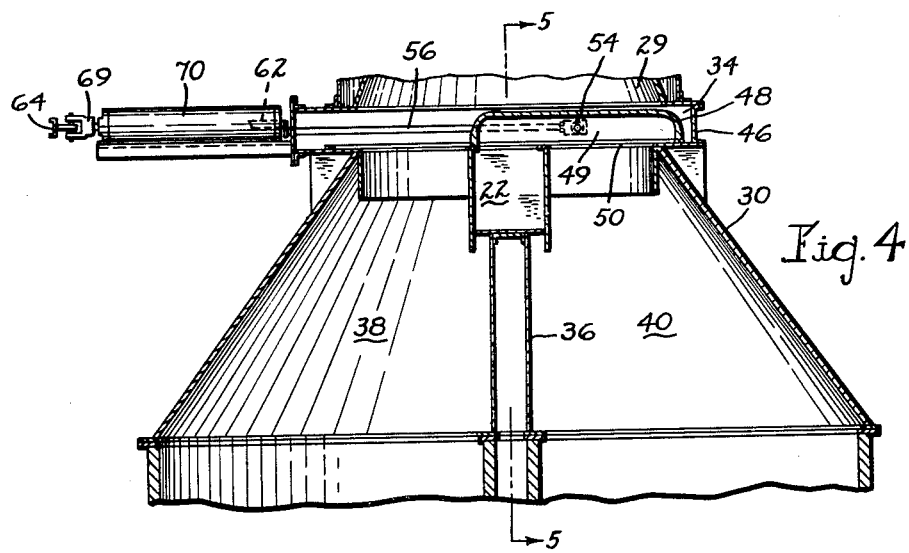
FIG. 4 is an enlarged sectional view taken along line 4—4 of FIG. 3.
Figure 5:
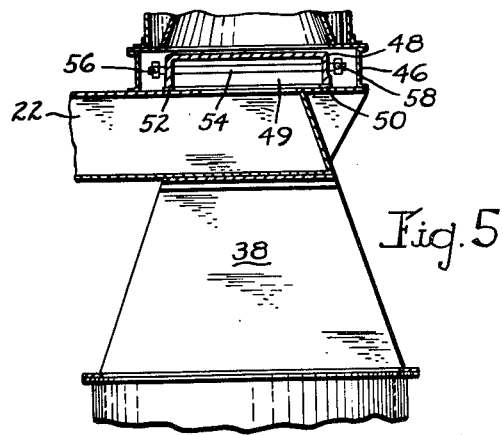
FIG. 5 is a vertical section on the same scale as FIG. 4 taken along lines 5—5 of FIG. 4.

Referring now to FIGS. 3–5, the construction and operation of the single slide valve mechanism will be described. As can be seen in FIG. 4, the valve housing 10 is comprised of a lower truncated conical hood 30 separated from the ejector unit 29 by the reversing mecha-"

nism indicated typically at 34. Although the hood 30 has been given a conical shape in the drawings, it should be understood that the hood can be fabricated in varied sizes and configurations. Conical hood 30 is in turn interiorly subdivided by partition 36 to form chambers 38 and 40 terminating at their upper extremities with exhaust ports 42 and 44.

The reversing mechanism indicated typically at 34 and contained within rectangular casing 46 will now be described. A slide valve 48 is shown supported by spaced horizontal tracks 50 and 52. As can be seen from FIGS. 4 and 5, slide valve 48 is comprised of turtle-shell damper forming a rectangular cavity 49. Rod 54 passing transversely through the side walls of slide valve 48 is pivotally connected at its extremities to links 56 and 58. Links 56 and 58 are in turn passed through apertures in casing 46 and attached to a movable frame comprised of parallel bars 60 and 62 in turn connected by transverse bracing member 64. Bracing member 64 is supported for horizontal movement by roller bearings 66 and 68.

Horizontal displacement of damper 48 along tracks 50 and 52 is accomplished by air cylinder 70 positioned between and attached to bracing member 64 and casing 46. When piston 69 contained within air cylinder 70 is in a retracted position as shown in FIGS. 3 through 7, damper 48 is displaced horizontally along tracks 50 and 52 to a position covering exhaust port 44. When so positioned, damper 48 permits the exit of waste gases from secondary regenerator 12 through exhaust port 42 and into ejector unit 29. At the same time, the escape of waste gases from checker 14 through aperture 44 is prevented by the body of valve 48.

In addition to preventing the outflow of waste gases, it should be carefully noted that because of the rectangular inner cavity 49 of valve 48, fresh air duct 22 is allowed to communicate with chamber 40, in turn connected to secondary checker 14. Thus it can be seen that two functions are performed by a single horizontal displacement of slide valve 48; the upward flow of waste gases through chamber 41 from checker 14 is prevented but allowed through chamber 38 from checker 12, and the inflow of fresh combustion air is allowed from duct 22 through cavity 49 and chamber 40 to checker 14 but prevented from entering checker 12.

To accomplish a subsequent reversal of the flow of gases through secondary checkers 12 and 14, slide valve 48 is simply horizontally displaced along tracks 50 and 52 to its opposite extremity of travel by actuating air cylinder 70 and extending piston 69 contained therein. In so doing, exaust port 42 is now covered by the body of valve 48. The inner cavity 49 of valve 48 now acts to place fresh air duct 22 in communication with exhaust port 42 and chamber 38 in turn connected to secondary checker 12.

Figure 6:
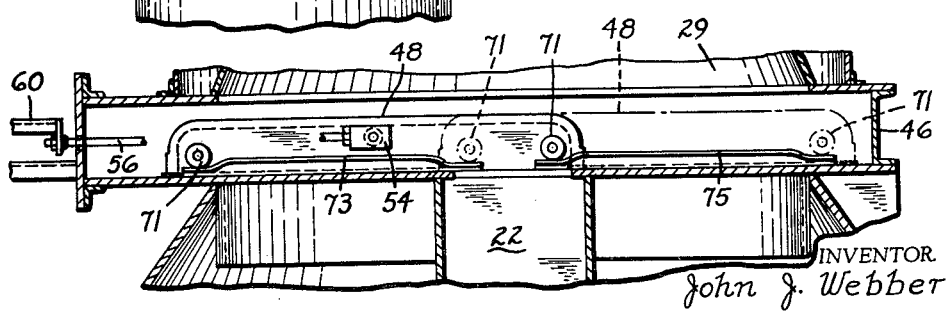
FIG. 6 is an enlarged sectional view of an alternate embodiment of the reversing mechanism.

FIG. 6 is an illustration of an alternate embodiment of the reversing mechanism wherein the slide valve 48 has been provided with rollers 71 suitably positioned for displacement along cam-shaped tracks 73 and 75. Thus it can be seen that when piston 69 is extended as withdrawn by the actuation of air cylinder 70, slide valve 48 is slidably displaced for a short distance then raised by the cam surface of the tracks and horizontally rolled before again being deposited and slidably displaced to its alternate position. This arrangement is particularly suited to extremely large installations where the weight of the slide valve would tend to promote undue frictional resistance to the operation of air cylinder 70 and in addition, result in extreme track wear.

Figure 7:
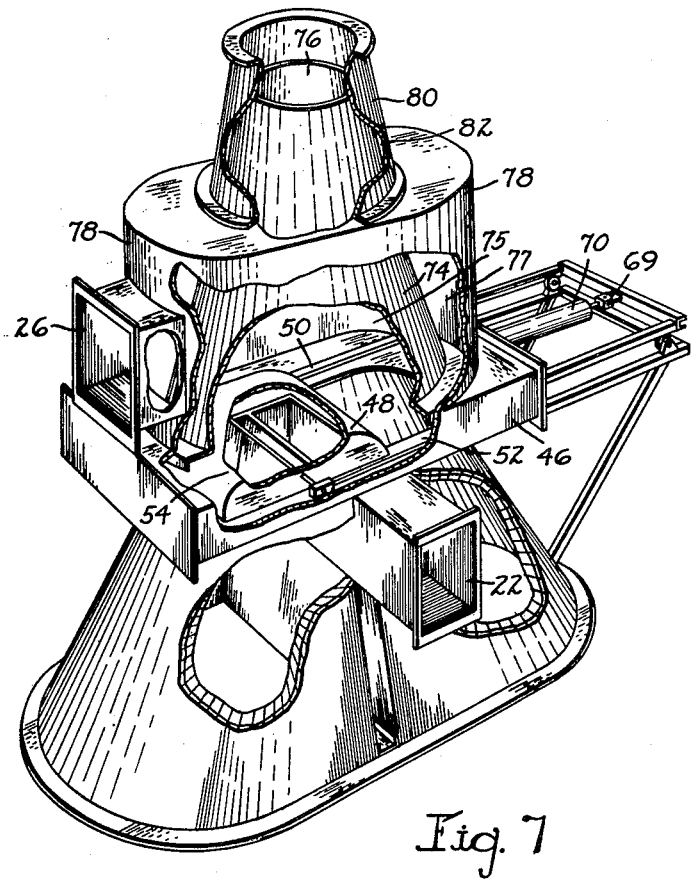
FIG. 7 is a view in perspective of the single valve slide housing and ejector unit with portions of the outer hoods cut away to illustrate the interior relationships of enclosed ducts and the operating mechanism of the slide valve.

The construction and operation of ejector unit 29 will now be described with particular reference to FIG. 7. Immediately above the sliding valve mechanism enclosed within casing 46 is a second truncated conical hood 74 forming a connecting chamber 75 which terminates in a centrally located upper opening 76. Surrounding hood 74 is a casing 78 which through a short truncated conical section 80 connects with the bottom end of stack 42. As can be seen from FIG. 7, section 80 surrounds the upper extremity of hood 74 and cooperates therewith to provide an annular orifice 82.

Duct 26 leads into the side of casing 78 and receives ejection air driven by combination motor and blower 28. The ejection air is driven upwardly through annular orifice 82, thereby insuring proper upward movement of the burned gases being exhausted through opening 76 from the uncovered exhaust port. It should be noted that although the outflow of waste gases will be alternated between secondary checkers 12 and 14 by the operation of valve 48, because hood 74 covers both exhaust ports 42 and 44 and is connected to a single stack 32, a constant flow of waste gas will ultimately be exhausted through upper openings 76. Consequently, no valves need be provided to alternate the flow of ejection air between separate stacks and motor 28 can be operated continuously. Thus it can be seen that by the utilization of the above-described arrangement, separate ejection stacks and air ejection reversing valves used in conventional constructions can be eliminated with a corresponding decrease of initial equipment investment. A further important advantage is gained by the above-described combination of an air ejector unit 29 and a single slide valve reversing mechanism 34. More particularly, as can best be seen in FIG. 7, the inner truncated conical hood 74 and the outer casing 78 of the air ejector are spaced to form a passageway 77 therebetween. Passageway 77 is closed at the bottom by the upper surface of rectangular casing 46 and terminates at its upper end in an annular orifice 82 formed between conical section 80 and the upper portion of hood 74.

With this construction, as relatively low temperature ejection air is forced through passageway 77 to orifice 82, a substantial cooling effect is imparted to hood 74, outer casing 78, and by a combination of radiation and conduction, to rectangular casing 46. Moreover, both connecting chamber 75 and the slide valve 48 contained therein are also cooled as the temperature of casing 46 and hood 74 is lowered. This of course results in the slide valve 48 and its reversing mechanism being continuously cooled by the uninterrupted flow of ejection air passing through ejector unit 29, thereby obviating the necessity to employ troublesome water cooling systems or heavy refractory constructions.

It is my intention to cover all changes and modifications of the example of the invention herein chosen for purposes of disclosure which do not constitute departures from the spirit and scope of the invention.

I claim:

1. Means for changing and controlling the direction of gas flow in the flues of a regenerative furnace, said means comprising a first housing enclosing two substantially equal chambers, each of said chambers adapted to be placed in communication at its lower end with one of said flues and terminating at its upper end in an exhaust port, said exhaust ports in communication with a second housing enclosing air ejector means, said air ejector means in turn in communication at its upper end with a common exhaust stack, a combustion air duct having an inlet positioned intermediate said exhaust ports, a slide valve positioned within said second housing between said exhaust ports and said common exhaust stack for movement from a position covering said inlet and one of said exhaust ports to a position covering said inlet and said other exhaust port, the uncovered exhaust port remaining in communication with said common exhaust stack, said slide valve acting as means for connecting the exhaust port over which it is positioned to said air inlet, and means for passing air through said air ejector means in order to cool said second housing and indirectly to cool the slide valve contained therein while inducing an updraft in said common exhaust stack.

2. The apparatus as set forth in claim 1 wherein said second housing comprises an outer wall and an inner truncated conical wall, said walls spaced to form a passageway therebetween, said inner wall enclosing a connecting chamber leading from said exhaust ports to said common exhaust stack, said passageway closed at the bottom and terminating at its upper end in an orifice in communication with said common exhaust stack, and means for forcing air into said passageway and out through said orifice in order to induce an updraft in said common exhaust stack while cooling said inner and outer walls and said connecting chamber.

3. The apparatus as set forth in claim 1 wherein said slide valve is formed with a concave surface facing said inlet and said exhaust ports, said concave surface forming a cavity extending from the exhaust port over which the valve is positioned to said inlet in order to provide a passageway therebetween.

4. Means for changing and controlling the direction of gas flow in the flues of a regenerative furnace, said means comprising the combination of: a first housing enclosing two substantially equal chambers, each of said chambers adapted to be placed in communication at its lower end with one of said flues and terminating at its upper end in an exhaust port; a combustion air duct having an inlet positioned intermediate said exhaust ports; air ejector means connecting said exhaust ports to a common exhaust stack, said air ejector means comprising a second housing having an outer wall and a truncated conical inner wall, said walls spaced to form a passageway therebetween, said passageway closed at the bottom and terminating at its upper end in an orifice in communication with said common exhaust stack; a slide valve positioned within said second housing between said exhaust ports and inlet and said common exhaust stack, means for moving said slide valve from a first position covering said inlet and one of said exhaust ports to a second position covering said inlet and said other exhaust port, the uncovered exhaust port remaining in communication with said common exhaust stack; said slide valve formed with a concave surface for connecting the exhaust port over which it is positioned to said air inlet; and means in communication with said second housing for forcing air into said passageway and out through said orifice in order to cool said second housing and the slide valve contained therein while inducing an up-draft in said common exhaust stack.

References Cited by the Examiner

UNITED STATES PATENTS

| | | | |
|---|---|---|---|
| 134,371 | 12/72 | Frank | 137—309 |
| 365,395 | 6/87 | Loss | 263—15 |
| 1,350,877 | 8/20 | Mayer et al. | 263—15 X |
| 1,362,539 | 12/20 | Moyer et al. | 263—15 |
| 2,723,842 | 11/55 | Hall | 263—15 |

CHARLES SUKALO, *Primary Examiner.*

JOHN J. CAMBY, *Examiner.*